United States Patent Office.

ALFRED D. FULLMER, OF BUFFALO, NEW YORK.

Letters Patent No. 100,520, dated March 8, 1870.

---

IMPROVEMENT IN TANNING.

---

The Schedule referred to in these Letters Patent and making part of the same.

---

I, ALFRED D. FULLMER, of the city of Buffalo, in the county of Erie, and State of New York, have invented an Improvement in the Process of Tanning, of which the following is a specification.

In preparing the hides or skins for the tanning process, they are first soaked in a vat of water, in which is dissolved saltpeter and Glauber's salt, in the proportion of about six pounds of each to every six hundred gallons of water. The hides are handled in this liquid three or four times per day for two days, which is generally sufficient to prepare them for the liming process. By removing the scum which collects on the surface after each soaking process, the same liquid, with slight additions of fresh material, may be used throughout the season.

For unhairing, the lime is prepared in the usual way, when I add thereto about one pound and a half of potash to every bushel of lime. The hides or skins are then treated in the ordinary manner for three or four days, according to their quality, when they will be ready to unhair.

After the hair has been removed, the hides are put in cold water, and are worked and fleshed in the usual manner. I then put them again in water, and fine-hair them.

A bate, composed of two pailsful of fermented fowl-dung to every one hundred skins, with hot water of about 120°. Fahrenheit, in sufficient quantity to cover the hides, is now prepared, in which the hides are stirred for about three hours. They are then worked on a beam, when they are made ready for my improved tanning process.

For this process I first prepare a tan as follows:

Take one hundred and twenty pounds gambier or terra japonica, twenty-five pounds of common salt, and two and a half pounds of potash, or the equivalent in ley, of about one hundred and twenty degrees strength, by barkometer, and dissolve together and strain.

In a vat containing five hundred pounds ordinary green hides I turn one-third of this tan, with water in sufficient quantity to cover the hides, which I handle therein four times the first day, and two or three times the second day. I then add to the liquor in the vat one-half of the remainder of the tan compound and five ounces of commercial sulphuric acid, and handle the skins at least twice per day for three days more.

The hides are now taken out and skived, and then returned to the tan, to which has been added the remainder of the liquid first prepared, and five ounces more of sulphuric acid, in which they are handled at least twice per day till properly tanned.

If the strength of the tan is required at any time to be still further increased, further additions of acid and the above compound, in the specified proportions, may be made thereto.

Before removing the hides from the tan I dissolve and add thereto three and a half pounds of Glauber's salt, three and a half pounds of alum, and one pound of borax, and handle four or five times, for one day.

The addition of these last ingredients, which form a part of my process, softens the hides, improves the color and quality of the hides generally. They are now removed, dried, and finished in the usual manner.

I would here remark that the treatment in respect to the various kinds of hides and skins, both green and dry, light and heavy, is to be varied according to their different requirements, the same as when the ordinary precesses are employed, it being a well-known fact that the oftener the skins are handled the better and sooner they will tan.

What I claim as my invention, is—

The process of tanning, as a whole, substantially as hereinbefore described.

In testimony whereof I have hereunto set my hand this 21st day of December, 1869, in the presence of two subscribing witnesses.

A. D. FULLMER.

Witnesses:
 JAY HYATT,
 JNO. J. BONNER.